(12) United States Patent
Chen et al.

(10) Patent No.: US 11,900,413 B2
(45) Date of Patent: *Feb. 13, 2024

(54) SYSTEMS AND METHODS FOR DETERMINING MEDIA CREATIVE ATTRIBUTION TO WEBSITE TRAFFIC

(71) Applicant: Tatari, Inc., San Francisco, CA (US)

(72) Inventors: Wei Chen, Santa Monica, CA (US); Michael D. Swinson, Santa Monica, CA (US)

(73) Assignee: TATARI, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/718,148

(22) Filed: Apr. 11, 2022

(65) Prior Publication Data
US 2022/0237653 A1 Jul. 28, 2022

Related U.S. Application Data

(63) Continuation of application No. 16/706,061, filed on Dec. 6, 2019, now Pat. No. 11,334,912.

(Continued)

(51) Int. Cl.
*G06Q 30/02* (2023.01)
*G06Q 30/0242* (2023.01)
(Continued)

(52) U.S. Cl.
CPC ....... *G06Q 30/0246* (2013.01); *G06F 16/955* (2019.01); *G06Q 30/0247* (2013.01);
(Continued)

(58) Field of Classification Search
None
See application file for complete search history.

(56) References Cited

U.S. PATENT DOCUMENTS 11,334,911 B1 5/2022 Swinson
11,348,136 B1 5/2022 Swinson
(Continued)

OTHER PUBLICATIONS

Al-Azmi, Abdul-Aziz Rashid, Data, Text, and Web Mining for Business Intelligence, International Journal of Data Mining & Knowledge Management Process (IJDKP), vol. 3, No. 2, Mar. 2013, 21 pgs.

(Continued)

*Primary Examiner* — David J Stoltenberg
(74) *Attorney, Agent, or Firm* — SPRINKLE IP LAW GROUP

(57) ABSTRACT

A media creative attribution method includes determining a response profile within an attribution time window, the response profile being a portion of a unique visitor (UV) curve associated with a website. In some cases, a shadow baseline analysis is run on every media creative that aired within an extended time window to determine whether to adjust the response profile. A total lift within the attribution time window is determined utilizing a baseline of the UV curve. A weight for each media creative that aired within the attribution time window is determined. Utilizing the weight, the total lift is allocated to individual media creatives that aired within the attribution time window. The allocated attribution can be utilized to generate performance metrics relating to the individual media creatives that aired within the attribution time window. The performance metrics such as cost per visitor can be visualized through a user interface or dashboard.

20 Claims, 9 Drawing Sheets

US 11,900,413 B2

Page 2

Related U.S. Application Data

(60) Provisional application No. 62/776,587, filed on Dec. 7, 2018.

(51) Int. Cl.
  G06Q 30/0241   (2023.01)
  G06Q 30/0272   (2023.01)
  G06F 16/955    (2019.01)
  H04N 21/24     (2011.01)
  H04L 67/50     (2022.01)

(52) U.S. Cl.
  CPC ..... G06Q 30/0272 (2013.01); G06Q 30/0277 (2013.01); H04L 67/535 (2022.05); H04N 21/2407 (2013.01)

(56) References Cited

U.S. PATENT DOCUMENTS

| | | | |
|---|---|---|---|
| 11,503,351 B2 | 11/2022 | Swinson | |
| 11,562,393 B1 | 1/2023 | Chen | |
| 11,763,341 B1 | 9/2023 | Swinson | |
| 11,770,570 B2 | 9/2023 | Swinson | |
| 2012/0054021 A1 | 3/2012 | Kitts | |
| 2012/0166267 A1* | 6/2012 | Beatty | G06Q 30/0219 705/14.46 |
| 2013/0325587 A1 | 12/2013 | Kothari | |
| 2014/0074587 A1* | 3/2014 | Briggs | G06Q 30/0254 705/14.41 |
| 2015/0371256 A1* | 12/2015 | Shah | G06Q 30/0268 705/14.64 |
| 2016/0027056 A1 | 1/2016 | Taslimi | |
| 2017/0068987 A1 | 3/2017 | Levinson | |
| 2017/0091806 A1* | 3/2017 | Cole | G06Q 30/0245 |
| 2018/0270544 A1* | 9/2018 | Ray | H04N 21/4532 |
| 2022/0215427 A1 | 7/2022 | Swinson | |
| 2023/0051566 A1 | 2/2023 | Swinson | |
| 2023/0117593 A1 | 4/2023 | Chen | |

OTHER PUBLICATIONS

Office Action for U.S. Appl. No. 17/700,984, dated Dec. 15, 2022, 8 pgs.
Office Action for U.S. Appl. No. 17/373,311, dated Jan. 6, 2023, 12 pgs.
2nd Notice of Allowance for U.S. Appl. No. 17/533,214, dated Aug. 12, 2022, 5 pgs.
Notice of Allowance for U.S. Appl. No. 16/705,813, dated Sep. 14, 2022, 17 Pgs.
Notice of Allowance for U.S. Appl. No. 17/533,214, dated Jul. 11, 2022, 6 pgs.
Office Action for U.S. Appl. No. 16/705,813, dated Apr. 13, 2022, 25 pgs.
Jungherr, Andreas, "Forecasting the pulse: How deviations from regular patterns in online data can identify offline phenomena," Internet Research, vol. 23, No. 5, pp. 589-607, at https://doi.org/10.1108/IntR-06-2012--0115.
Office Action for U.S. Appl. No. 17/977,486, dated Mar. 16, 2023, 12 pgs.
Office Action for U.S. Appl. No. 17/700,984, dated Apr. 3, 2023, 7 pgs.
Fitting generalized linear models, Dec. 12, 2013, retrieved Mar. 28, 2023 at https://stat.ethz.ch/R-manual/R-devel/library/stats/html/glm.html, 8 pgs.
Notice of Allowance for U.S. Appl. No. 17/373,311, dated Apr. 28, 2023, 7 pgs.
Notice of Allowance for U.S. Appl. No. 17/977,486, dated May 16, 2023, 5 pgs.
Notice of Allowance for U.S. Appl. No. 17/700,984, issued by the U.S. Patent and Trademark Office, dated Sep. 13, 2023, 8 pgs.
Notice of Allowance for U.S. Appl. No. 17/718,148, issued by the U.S. Patent and Trademark Office, dated Sep. 27, 2023, 7 pgs.

* cited by examiner

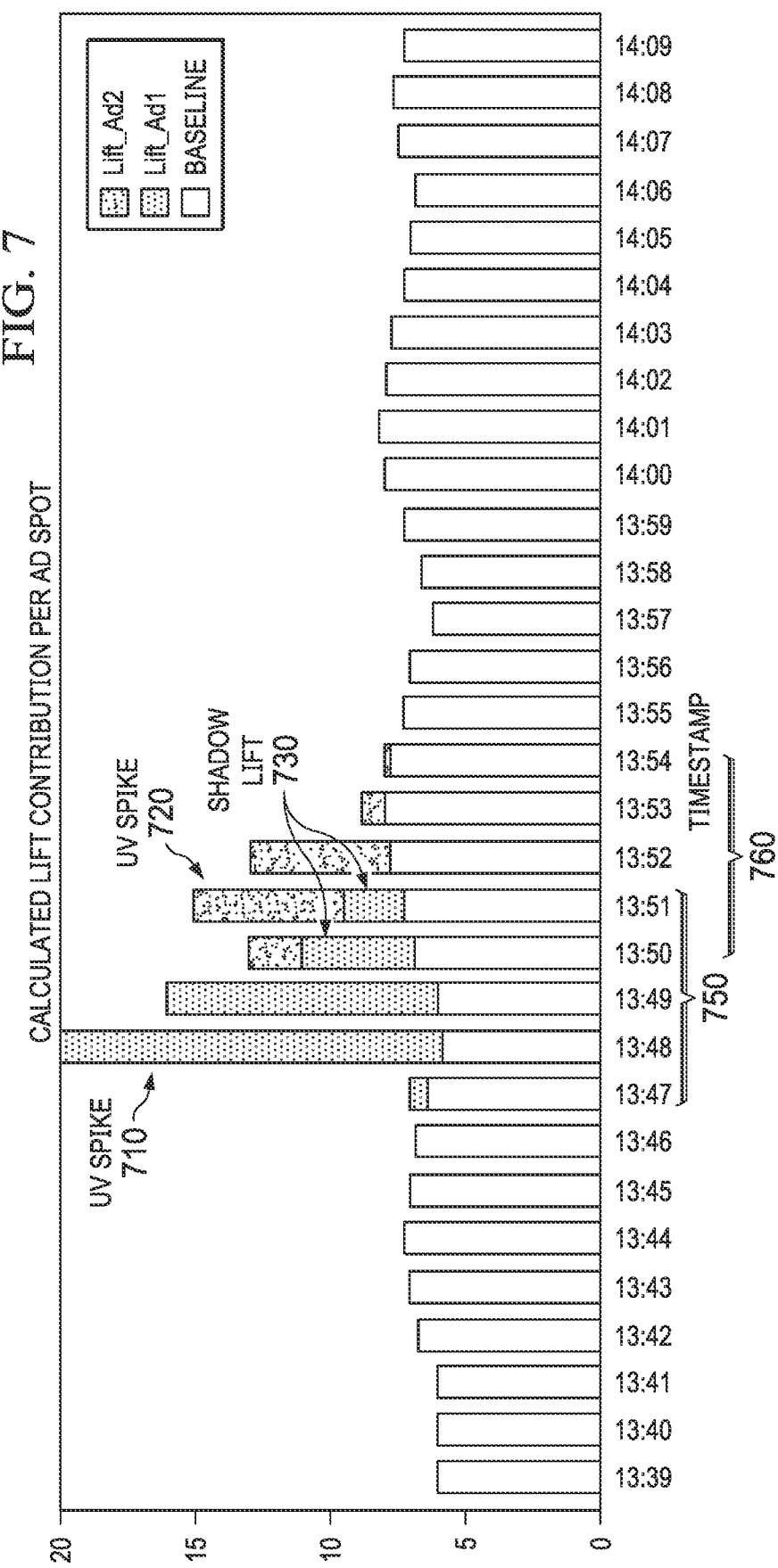

TO FIG. 8B

| | | conv minimum | uv-baseline | | | 2018-09-10 13:47:42 | | | |
|---|---|---|---|---|---|---|---|---|---|
| | | | | second | 42 | | | | |
| | | | | spend | 400 | | | | |
| | | | | minimum sum | 5 | | | | |
| | | | | spot lift | 31.305710 | | | | |
| | | | | minimum fraction | ref minimum | profile rate | weight | lift | attributable lift |
| | | 2018-09-10 13:43 | 1 | 0 | | | | | |
| | | 2018-09-10 13:44 | -0.2 | | | | | | |
| | | 2018-09-10 13:45 | -2 | | | | | | |
| | | 2018-09-10 13:46 | -1.8 | | | | | | |
| | | 2018-09-10 13:47 | 0.6 | 1 | 0 | 0.11357341 | 45.429364 | 0.600000 | 0.600000 |
| | | 2018-09-10 13:48 | 14.2 | 1 | 1 | 0.44182825 | 176.7313 | 14.200000 | 14.200000 |
| | | 2018-09-10 13:49 | 10 | 1 | 2 | 0.23268698 | 93.074792 | 10.000000 | 10.000000 |
| | | 2018-09-10 13:50 | 6.2 | 1 | 3 | 0.11911357 | 47.645428 | 4.198425 | 4.198425 |
| | | 2018-09-10 13:51 | 7.8 | 1 | 4 | 0.09279778 | 37.119112 | 2.307285 | 2.307285 |
| | | 2018-09-10 13:52 | 7.2 | 1 | 5 | 0.04820721714 | 19.28288686 | 2.109331 | 0.000000 |
| | | 2018-09-10 13:53 | 1.2 | 1 | 6 | 0.02823348665 | 11.29339466 | 0.385922 | 0.000000 |
| | | 2018-09-10 13:54 | 0.2 | 1 | 7 | 0.01653548608 | 6.614194432 | 0.052548 | 0.000000 |
| | | 2018-09-10 13:55 | -1.2 | 1 | 8 | 0.009684326396 | 3.873730558 | -0.343945 | 0.000000 |
| | | 2018-09-10 13:56 | -1 | 1 | 9 | 0.005671812566 | 2.268725026 | -0.286621 | 0.000000 |
| spot 1 | 2018-09-10 13:47:42 | | | | | | | | |
| spot 2 | 2018-09-10 13:50:45 | | | | | | | | |

FIG. 8A

| 2018-09-10 13:50:45 | | | | | | | |
|---|---|---|---|---|---|---|---|
| second | 45 | | | | | | |
| spend | 200 | | | | | | |
| minimum sum | 5 | | | | | | |
| spot lift | 13.54649 | | | | | | |
| minimum fraction | ref minimum | profile rate | weight | lift | attributable lift | Total minimum weight | sum minimum lift |
| | 0 | 0.11357341 | 22.714682 | | | 0 | 0.000000 |
| | 1 | 0.44182825 | 88.36565 | | | 0 | 0.000000 |
| | 2 | 0.23268698 | 46.537396 | | | 0 | 0.00 |
| 1 | 3 | 0.11911357 | 23.822714 | | | 0 | 0.00 |
| 1 | 4 | 0.09279778 | 18.559556 | | | 45.429364 | 0.60 |
| 1 | 5 | 0.04820721714 | 9.641443428 | | | 176.7313 | 14.20 |
| 1 | 6 | 0.02823348665 | 5.64669733 | | | 93.074792 | 10.00 |
| 1 | | | | 2.001575 | 2.001575 | 70.36011 | 6.20 |
| 1 | | | | 5.492715 | 5.492715 | 125.484762 | 7.80 |
| 1 | | | | 5.090669 | 5.090669 | 65.82028286 | 7.20 |
| 1 | | | | 0.814078 | 0.814078 | 35.11610866 | 1.20 |
| 1 | | | | 0.147452 | 0.147452 | 25.17375043 | 0.20 |
| 1 | | | | -0.856055 | 0.000000 | 13.51517399 | -1.20 |
| 1 | | | | -0.713379 | 0.000000 | 7.915422356 | -1.00 |

FROM FIG. 8A

FIG. 8B

SYSTEMS AND METHODS FOR DETERMINING MEDIA CREATIVE ATTRIBUTION TO WEBSITE TRAFFIC

CROSS-REFERENCE TO RELATED APPLICATION(S)

This application is a continuation of, and claims a benefit of priority under 35 U.S.C. 120 of, U.S. patent application Ser. No. 16/706,061 filed Dec. 6, 2019, issued as U.S. Pat. No. 11,334,912, entitled "SYSTEMS AND METHODS FOR DETERMINING MEDIA CREATIVE ATTRIBUTION TO WEBSITE TRAFFIC," which claims a benefit of priority under 35 U.S.C. § 119(e) from U.S. Provisional Application No. 62/776,587, filed Dec. 7, 2018, entitled "SYSTEMS AND METHODS FOR DETERMINING MEDIA CREATIVE ATTRIBUTION TO WEBSITE TRAFFIC," which are fully incorporated by reference herein for all purposes.

TECHNICAL FIELD

This disclosure relates generally to correlated data processing. More particularly, this disclosure relates to systems, methods, and computer program products for correlated data processing for determining offline media creative attribution to online traffic of a website on the Internet.

BACKGROUND OF THE RELATED ART

With the advent of the Internet, many aspects of modern life are now digitally connected through the seemingly ubiquitous smart phones, smart televisions (TV), smart home appliances, Internet of Things (IoT) devices, websites, mobile apps, etc. Even so, many more analog aspects remain disconnected from this digital world. Linear TV is an example of an offline medium that is disconnected from the digital world.

"Linear TV" refers to real time (live) television services that transmit TV program schedules. Almost all broadcast TV services can be considered as linear TV. Non-linear TV covers streamlining and on-demand programming, which can be viewed at any time and is not constrained by real-time broadcast schedules. Video-on-demand (VOD) and near video-on-demand (NVOD) transmissions of pay-per-view programs over channel feeds are examples of non-linear TV.

Because linear TV is an offline medium, it is not possible to automatically collect information on viewers of linear TV. This creates a data gap problem. To address this data gap program, Nielsen Media Research devised audience measurement systems to determine the audience size and composition of television programming in the United States. Nielsen television ratings are gathered in one of two ways—using viewer diaries or set meters attached to TVs in selected homes. The former requires a target audience self-record their viewing habits. The latter requires a special device to collect specific viewing habits on a minute to minute basis and send the collected information to Nielsen's system over a phone line.

While Nielsen's audience measurement systems can provide some quantified measures of audience response to TV programs, the Nielsen television ratings do not measure how TV commercials (referred to herein as "media creatives," "ads," "ad spots," "TV spots," or "spots") attribute to a website's online traffic. This is, in part, because there is a natural distinction between two mediums: online (e.g., search engine marketing) and offline (e.g., linear TV).

The online medium is effective when consumers are already accessing the Internet through a website or mobile app. When a user is attracted to a product and visits a website for the product through the online medium (e.g., the website or mobile app showing an ad about the product), there is a session associated with that referring website or mobile app. Thus, tracking a website visitor's movement from an online medium to the website is a relatively straightforward process that can be done through tracking the session at the website (e.g., using a tracking pixel embedded in a page or pages of the website or mobile app that sends data to a server of the website operator or a third-party entity).

The offline medium, on the other hand, aims to drive consumers first to the Internet and then to the product's website or app. Unlike the online medium, there is neither session tracking nor a direct relationship between the offline medium and the desired result. Thus, suppose a spot that aired on linear TV encouraged its viewer to visit a website or download an app, it can be extremely difficult to measure the impact of that spot and quantifiably attribute any website visit or app download to the particular spot.

The natural distinction between the online and offline mediums creates a data gap between the digital world and the analog world. In turn, this data gap makes it difficult to correlate data from the digital world and the analog world and accurately measure the impact or attribution of a TV spot to a website's traffic. In the past, a typical approach for evaluating the performance of a TV commercial is to define the efficiency (E) of that TV commercial as Response per Amount Spent where E is defined as $E=100*\text{lift}/(\text{ad spend})$. In this case, "lift" is a metric for measuring a TV commercial in the context of a particular type of campaign—in this example, for measuring how much increase (lift) per $100 ad spend. This approach is generally independent to where and when the TV commercial aired on television networks.

SUMMARY OF THE DISCLOSURE

The approach described above can be inadequate in some cases. For instance, in some cases, a company or organization may want to measure the effectiveness of a TV spot (or, the efficiency of an ad spend) in the physical world by the number of unique visitors (UVs) to its website in the online world. For example, a TV spot that aired immediately prior a UV spike to the website (that can be measured by a server machine hosting the website) can be considered to have attributed to the UV spike.

The integration under this spike is called a "lift," which can be determined based on the difference between the actual number of UVs and a "baseline." Here, "baseline" refers to a UV curve for the website without any TV spot airing. It is practically impossible, if not extremely difficult, to construct an accurate baseline for the website. One reason is that a website on the Internet can be continuously influenced by many factors in the real world. Another reason is that multiple TV spots could be airing at any given time in different places. Accordingly, UVs could visit the website from virtually anywhere for a variety of reasons—they could be influenced to visit the website by different TV spots aired at geographically disparate locations. Although they could also be influenced to visit the website and/or directed to the website from other sites on the Internet, this kind of online influences is considered as part of normal traffic to the website and thus is not isolated in determining a UV baseline for the website.

An object of this disclosure is to provide a solution that can close the data gap between the digital world and the analog world by meaningfully and effectively correlating data from the digital world and the analog world and measuring the impact or attribution of a TV spot to the online traffic of a website on the Internet in an accurate and efficient manner. According to embodiments, this and other objects can be achieved in a media creative attribution method comprising determining a response profile on a minute-by-minute basis within an attribution time window. In some embodiments, the attribution time window has a size of five minutes. The response profile refers to a portion of a unique visitor (UV) curve associated with a website. The response profile represents a temporal fingerprint or pattern for a media creative that aired on an offline medium. In some embodiments, the response profile begins at a first time that a first media creative aired on an offline medium and includes a second time that a second media creative aired after the first media creative aired at the first time.

In some embodiments, the method further includes obtaining a baseline of the UV curve associated with the website and determining, utilizing the baseline, a total lift within the attribution time window. In some embodiments, the total lift is determined by subtracting the baseline from the UV spike to obtain a lift per minute and aggregating the lift per minute within the attribution time window.

In some embodiments, the method further includes determining, utilizing a weighting function, a weight for each media creative that aired within the attribution time window, the weighting function comprising a plurality of factors, the plurality of factors including an audience size for each media creative that aired within the attribution time window. In some embodiments, dollar spend per media creative is used as a proxy for the audience size factor.

In some embodiments, the method further includes allocating the total lift to individual media creatives that aired within the attribution time window, the allocating including applying the weight for each media creative that aired within the attribution time window.

In some embodiments, the method further includes determining, utilizing portions of the total lift allocated to individual media creatives that aired within the attribution time window, performance metrics relating to the individual media creatives that aired within the attribution time window, and presenting, through a user interface, the performance metrics on a display.

In some embodiments, the response profile includes a shadow lift from a media creative that aired outside the attribution time window. In such embodiments, the method further comprises determining a shadow baseline for an extended time window that extends beyond the attribution time window and, prior to determining the total lift within the attribution time window, adjusting the baseline utilizing the shadow baseline.

In some embodiments, the method may further include running a shadow baseline analysis within the extended time window on every media creative that aired within the extended time window and, based on the shadow baseline analysis, determining whether to adjust the response profile prior to determining the total lift within the attribution time window. In some embodiments, the extended time window has a size of about 15 to 20 minutes.

One embodiment may comprise a system having a processor and a memory, the system configured to implement the SCI process disclosed herein. One embodiment may comprise a computer program product that comprises a non-transitory computer-readable storage medium which stores computer instructions that are executable by a processor to perform the SCI process disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 7 depicts a stacked radiogram illustrating another example of a complex response profile.

FIGS. 8A and 8B together show a chart illustrating how a lift in a UV line can be attributed to multiple TV spots that aired close in time.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
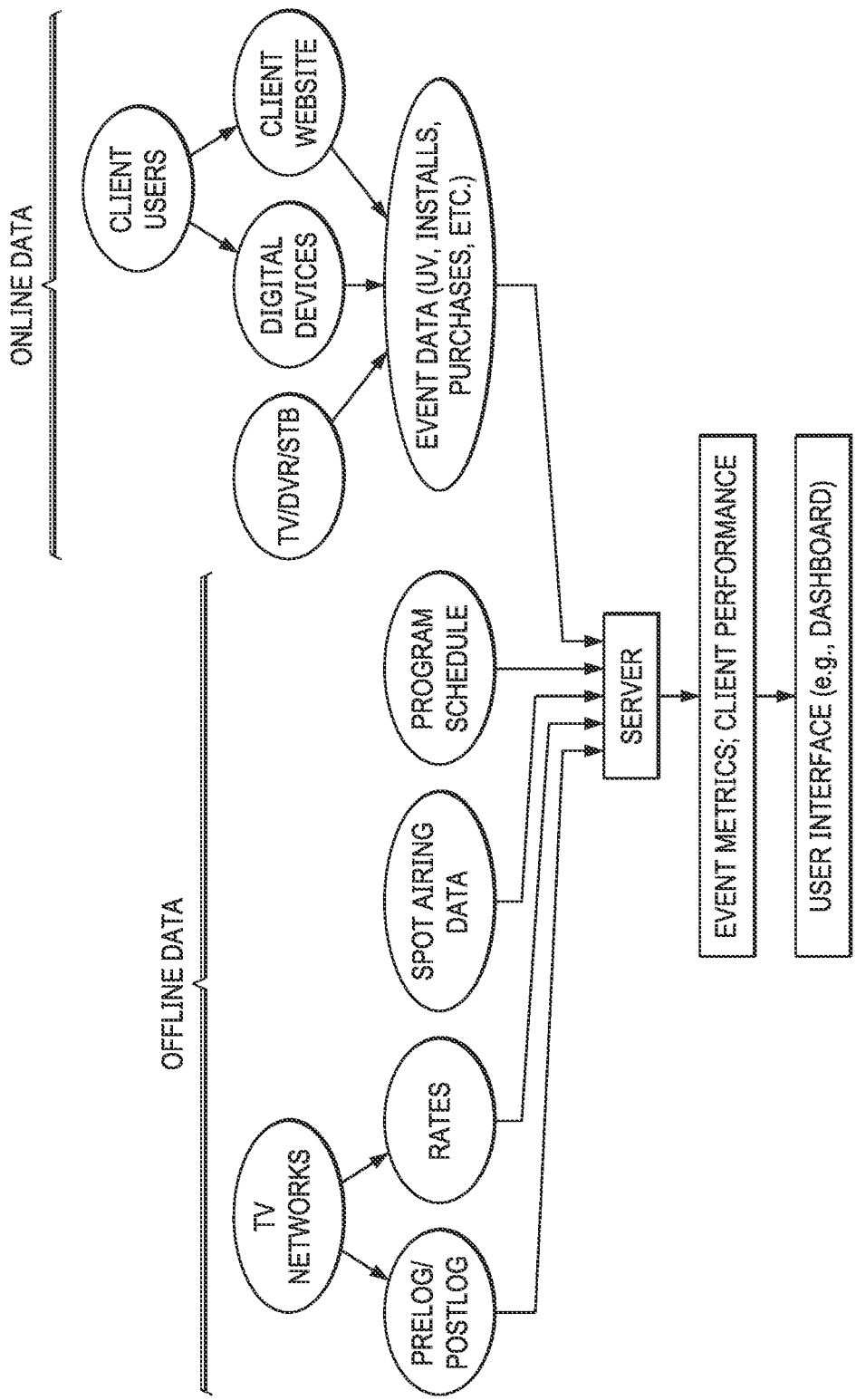
FIG. 1 depicts a diagrammatic representation of a network environment in which embodiments disclosed herein can be implemented.

As illustrated in FIG. 1, there is a natural distinction between online data and offline data. For instance, data aggregated and/or provided by online and offline data sources can have very different data types. When a TV commercial (which is an example of a media creative) is presented to an audience through an online medium (e.g., a website or a mobile application acting as an advertising channel), the online medium can be an effective tool for a server that is programmed to compute the performance efficiency of that TV commercial. This is because the audience (i.e., potential consumers of a product or service offered by the TV commercial) is already accessing the Internet through the website or the mobile application. When a user is attracted to or interested in the product or service and visits the website or uses the mobile application to access the product or service, there is a session associated with that advertising channel. Thus, whether such a session results in a sale (or conversion) is a relatively straightforward process that can be done through tracking the session at the website or the mobile application (e.g., using a tracking pixel embedded in a page or pages that sends data to a server computer hosting the website or one that is associated with an entity offering the product or service).

The offline medium (e.g., linear TV), on the other hand, aims to drive potential consumers first to the Internet and then to a website or application where a product or service is offered. Unlike the online medium, there is neither session tracking nor a direct relationship between the offline medium and the desired result. Without digital evidence collected from TV viewers and TV networks, it is not possible to directly assess the performance efficiency of a media creative. This disconnect makes it extremely difficult to truly measure the performance of a media creative and accurately attribute the media creative's impact to the number of UVs to a website on the Internet.

As alluded to above, an object of this disclosure is to provide a solution that can close the data gap between the digital world and the analog world. A system implementing the solution is adapted to meaningfully and effectively correlate data from the digital world and the analog world and measure the impact or attribution of a TV spot to the online traffic of a website on the Internet in an accurate and efficient manner. An example is illustrated in FIG. 2.

Figure 2:
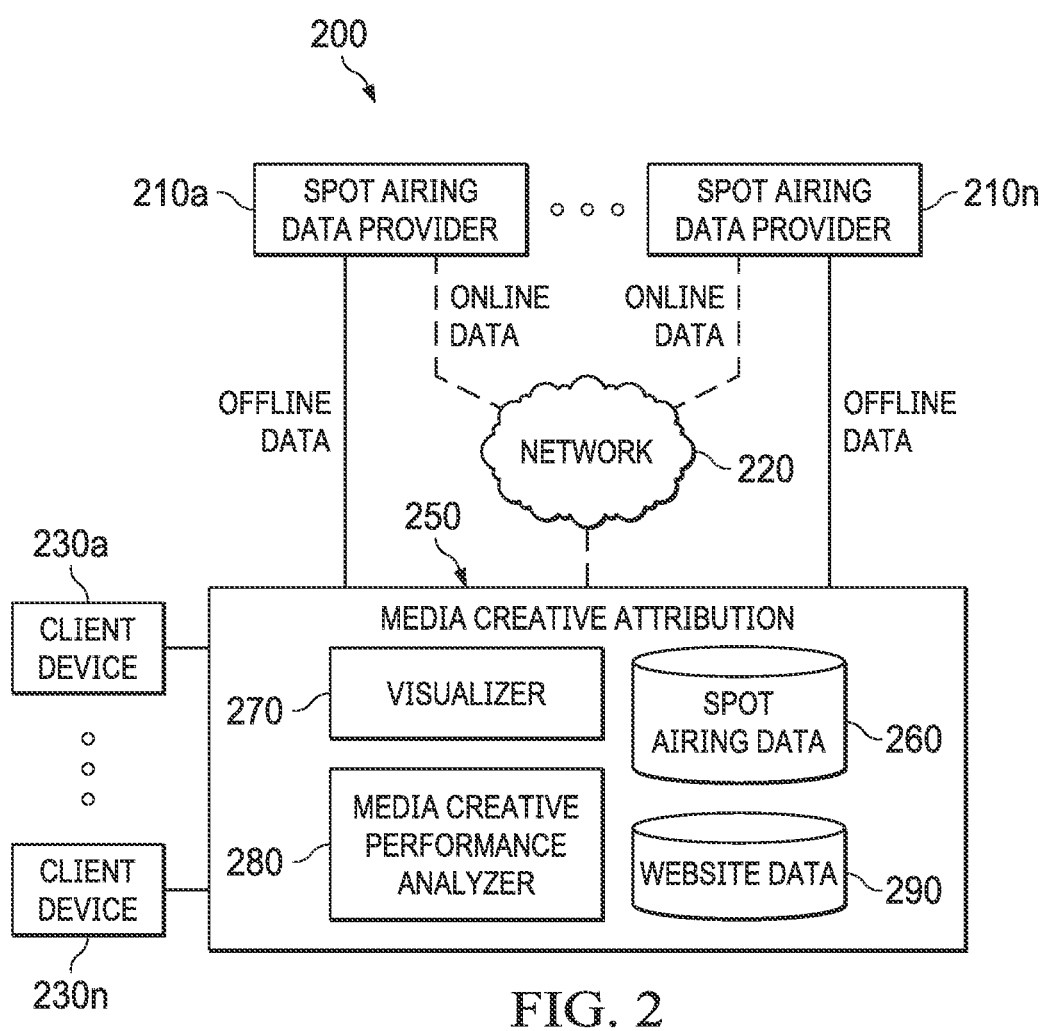
FIG. 2 depicts a diagrammatic representation of a media creative attribution system operating in a network environment according to some embodiments.

More specifically, FIG. 2 shows media creative attribution system 250 communicatively connected to spot airing data providers 210a . . . 210n through analog communication channels (e.g., telephones, mail, couriers, etc.) and also to spot airing data providers 210a . . . 210n over network 220 (e.g., Internet) in network environment 200. Examples of spot airing data providers 210a . . . 210n can include TV networks, media agencies, third-party data providers such as a market research firm, etc.

In some embodiments, media creative attribution system 250 may be implemented on one or more server machines operated by a media performance analytics service provider. In some embodiments, media creative attribution system 250 can reside on a cloud-based server operating in a cloud computing environment.

The media performance analytics service provider may purchase spots from TV networks to air media creatives. The media performance analytics service provider may provide media creative attribution system 250 with access to ad spend information which, in turn, enables media creative attribution system 250 to compute efficiency for each media creative per each network. Additionally or alternatively, spot airing data providers 210a . . . 210n can provide online data and/or offline data, as exemplified in FIG. 1. Examples of offline data can include spot airing logs (before and after spots have aired) and rates from TV networks, spot airing data, program schedules, etc.

Spot airing data generally includes what and when spots aired and on what network. Often there is not a uniform format of spot airing data received or obtained from spot airing data providers 210a . . . 210n. Media creative attribution system 250 is operable to uniquely identify and store spot airing data per each instance of a spot airing on a particular network at a particular time in spot airing data database 260. In one embodiment, media creative attribution system 250 is operable to perform, where necessary, data cleansing operations such as deduplication, normalization, data format conversion, etc. Likewise, media creative attribution system 250 is operable to store online data in website data database 290. Examples of online data can include website data for a particular website, including the number of UVs visiting the website at a given time, the number of installations ("installs") by website visitors, the number of purchases made at the website, etc.

In the example of FIG. 2, media creative attribution system 250 further includes media creative performance analyzer 280 and visualizer 270. As described below, media creative performance analyzer 280 is configured for determining media creative attribution and corresponding performance metric(s). The media creative performance metrics can be utilized for presentation on, e.g., on client devices 230a . . . 230n through a user interface (UI) generated by visualizer 270. In some embodiments, visualizer 270 is adapted for generating various visualizations particularly useful for decision making purposes.

Theoretically, a UV baseline of a website could be deduced by removing UV spikes attributable to TV spots from the actual UV numbers. However, intrinsic minute UV fluctuations are impossible to model. In some embodiments, a new "self-consistent" approach implemented on an inception architecture, referred to as the self-consistent inception (SCI) architecture, can be utilized to determine an accurate baseline for a website. Details of the SCI architecture can be found in a co-pending U.S. patent application Ser. No. 16/705,813, filed Dec. 16, 2019, entitled "SELF-CONSISTENT INCEPTION ARCHITECTURE FOR EFFICIENT BASELINING MEDIA CREATIVES," which is incorporated by reference herein. Other baselining methodologies may also be used.

Once an accurate baseline is derived or otherwise generated, a system implementing an embodiment disclosed herein is adapted to determine a lift, for instance, on a minute-by-minute basis, by subtracting the baseline at a particular point in time from the number of UVs at that time. Since such a lift can be an important metric in measuring the performance of a media creative (e.g., its attribution to the number of UVs at the website), it can be important to accurately attribute the lift to the correct TV spot.

A basic approach for attribution determination is to take the number of UVs minus the determined baseline within a window (e.g., five minutes) and assign the difference as lift. Cumulative lift within an attribution window of a spot is then assigned to that spot. This basic approach works well when there is only one TV spot within the window and when the TV spot within the window is not in the shadow of a previously aired, larger TV spot. For example, suppose a website generally has 100 UVs (baseline). Immediately (e.g., one or two minutes) after a media creative is aired, the number of UVs jumps to 250 (which is a UV spike that can be observed from website traffic data). The lift is the difference between the UV spike (250) and the baseline (100), which is 150. In this example, since there's only one media creative in the window, 100 percent of the lift is attributed to the media creative.

This basic approach can be improved upon in cases of TV spots that air in close proximity temporally. In practice, multiple media creatives could air near each other in time or even at the same time. Because these airings take place in the offline world, it is not possible to accurately allocate their individual attribution to the increase in the number of UVs to a website using conventional online tracking mechanisms. However, despite the inherent data gap problem, in some cases, a website operator and/or a company that owns the website may want to know how offline media creatives attribute to its online website traffic.

To this end, embodiments disclosed herein provide a new approach for determining media creative attribution to website traffic. This approach leverages various media creative features, such as size of audience, temporal fingerprint, and historical network performance, to assign allocation. In some cases, incorporation of some of these features can be straightforward. For others, it is considerably more complex. A straightforward example is described with reference to FIGS. 3 and 4.

Generally, for each media creative (e.g., a TV spot) aired, there is a tell-tale temporal response pattern or UV changes observable from the website traffic data. This temporal pattern or temporal fingerprint is referred to herein a response profile. The response profile includes the number of UVs on a minute-by-minute basis within a time window (e.g., five minutes). Such a response profile can be a portion of a UV curve within a time window after the airing of a media creative.

Figure 4:
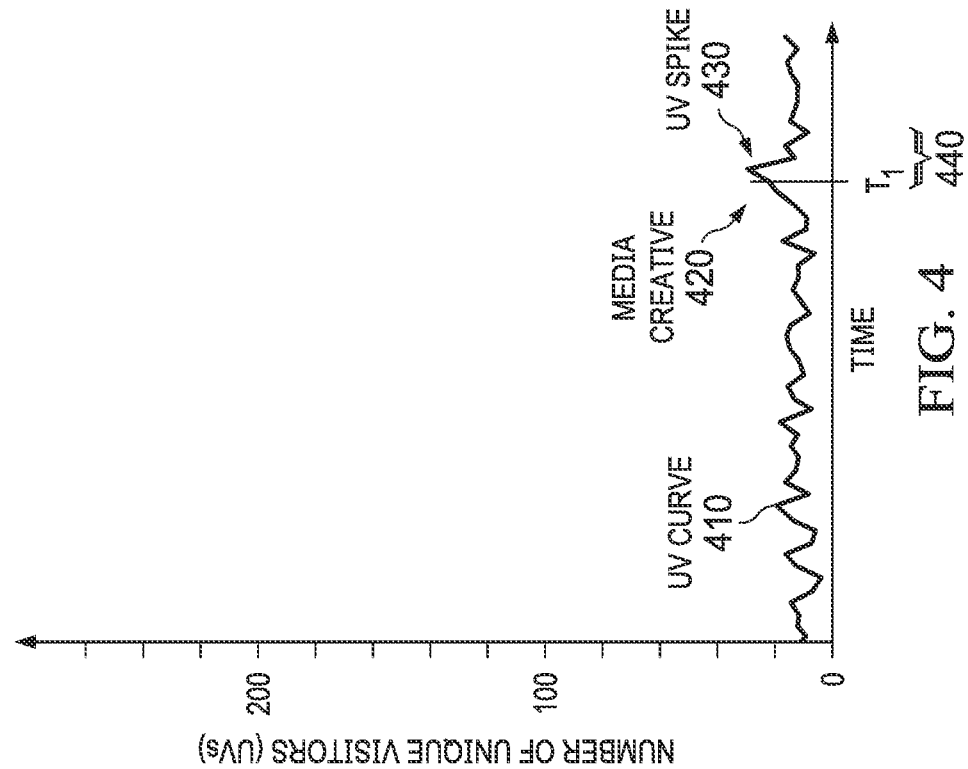
FIG. 4 depicts a plot diagram illustrating an example of a response profile.
Figure 3:
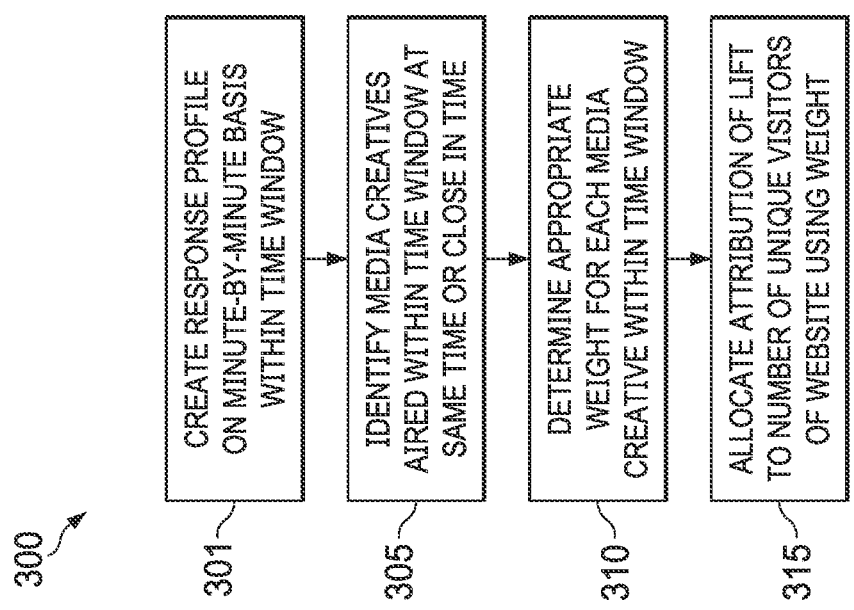
FIG. 3 is a flow chart illustrating an example of a media creative attribution method according to some embodiments disclosed herein.

Referring to FIG. 3, method 300 may include creating a response profile on a minute-by-minute basis within an attribution time window (e.g., five minutes) (301). As illustrated in FIG. 4, this response profile can be a portion of a UV curve within a time window after the airing of a media creative.

In the example of FIG. 4, media creative 420 was aired at a point in time ($T_1$). From the website traffic data, it can be seen that UV spike 430 occurred within time window 440 after media creative 420 was aired (e.g., $T_1$+ five minutes). The portion of UV curve 410 within time window 440, which includes UV spike 430, is referred to herein as a response profile.

Such a response profile can be determined by correlating the number of UVs tracked at the website with the airing time of media creative 420 and tracking the number of UVs within an attribution time window. The airing time of media creative 420 can be obtained from the provider of media creative 420 and/or the media channel (e.g., a TV network) that aired (or will air) media creative 420. In the example of FIG. 4, no other media creative aired at the same time or close in time to media creative 420. Thus, the lift (i.e., UV spike 430 minus the baseline of UV curve 420) is attributable 100 percent to media creative 420.

In the example of FIG. 4, for purposes of lift evaluation, a tight attribution time window is used. In this case, a "tight" attribution time window is 5 minutes. The reason for a tight attribution time window is to ensure that a discernible signal can be isolated relative to noise. So long as the signal-to-noise ratio is sufficient to pick out the signal, any suitable attribution time window can be used.

Figure 5:
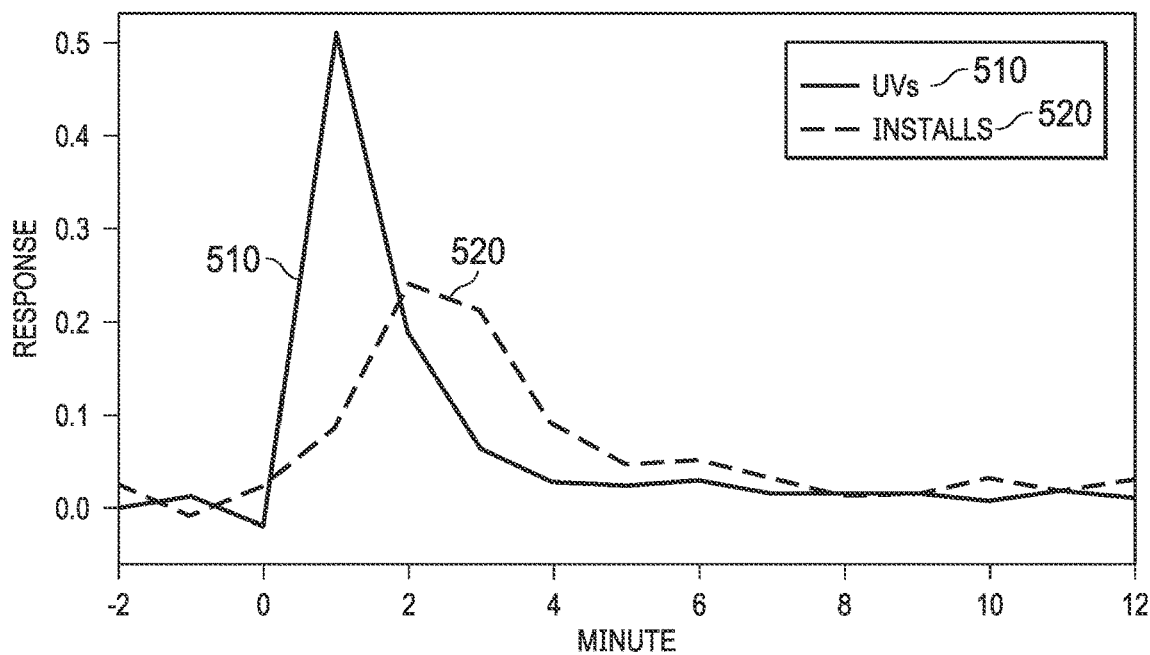
FIG. 5 depicts a plot diagram illustrating an example of how a time window can be selected for a response profile.

That is, the size of an attribution time window is configurable and can vary from implementation to implementation. In some cases, the window size can be assigned based on domain knowledge (e.g., a lift to a website's UV line usually occurs within five minutes after a TV spot showing the website's address is aired versus a lift in the number of downloads and installations of a company's app (e.g., a software product that runs on iOS or Android) usually occurs within fifteen minutes after a TV spot for software download and installation is aired). In some cases, the system can aggregate data on various types of TV spots associated with a website and determine a response profile based on a majority of the type of TV spots associated with the website. FIG. 5 shows an example of a process in selecting a time window size for spot attribution.

In some embodiments, the time window size selection process involves two steps. The first and the most important step is to run a deconvolution process on the aggregated data, effectively averaging responses from a series of TV spots and generating an average response profile that has a greatly enhanced signal-to-noise ratio. The average response profile is visualized so that a practitioner can visually identify an appropriate window size for spot attribution, which will not be possible otherwise.

In some embodiments, the time window size for spot attribution may be computed per an enterprise or website, or could be calculated separately for different segments of an enterprise's or website's ad campaigns. For instance, a practitioner might choose to isolate certain segments for which differences in the response window might be expected, e.g., by platform and/or metric being evaluated. For example, response times from a TV commercial aired on an offline medium might be different than responses when the TV commercial is aired on an online medium such as a streaming platform. Similarly, the metric evaluated can impact the response time as well, as the time for a user to respond by going to a particular website mentioned in a TV spot might be different than the time needed for a user to download and install a software product mentioned in a TV spot.

While specific response profiles may differ from one media creative to another, generally, after a media creative is aired, an initial UV spike may occur, following by an exponential decay. The impact or influence of the media creative generally tapers out over time. However, in some cases, a time window of five minutes may capture both the initial lift and the tail end of the lift. When multiple media creatives air at the same time or close in time, the later one may benefit from the earlier one, especially if the later one is smaller than the earlier one in terms of dollar spend. Identifying how many media creatives aired within the attribution time window can affect how media creative attribution is computed. Thus, in some embodiments, method 300 may further include identifying media creatives aired within the attribution time window (305).

As a non-limiting example, to compute media creative attribution when multiple media creatives aired within the same attribution time window, the system may first obtain a baseline of UVs (e.g., using the Self-Consisting Inception approach described in the above-referenced co-pending patent application). Utilizing the baseline, the system may determine a total lift by a UV spike within the attribution time window. The system may do so on a minute-by-minute basis. That is, for each minute in an attribution time window having a predetermined size, the system subtracts the baseline from the UV spike to obtain a lift per minute. The system then aggregates the lift per minute within the attribution time window to get a total lift for a specific media creative.

Figure 6:
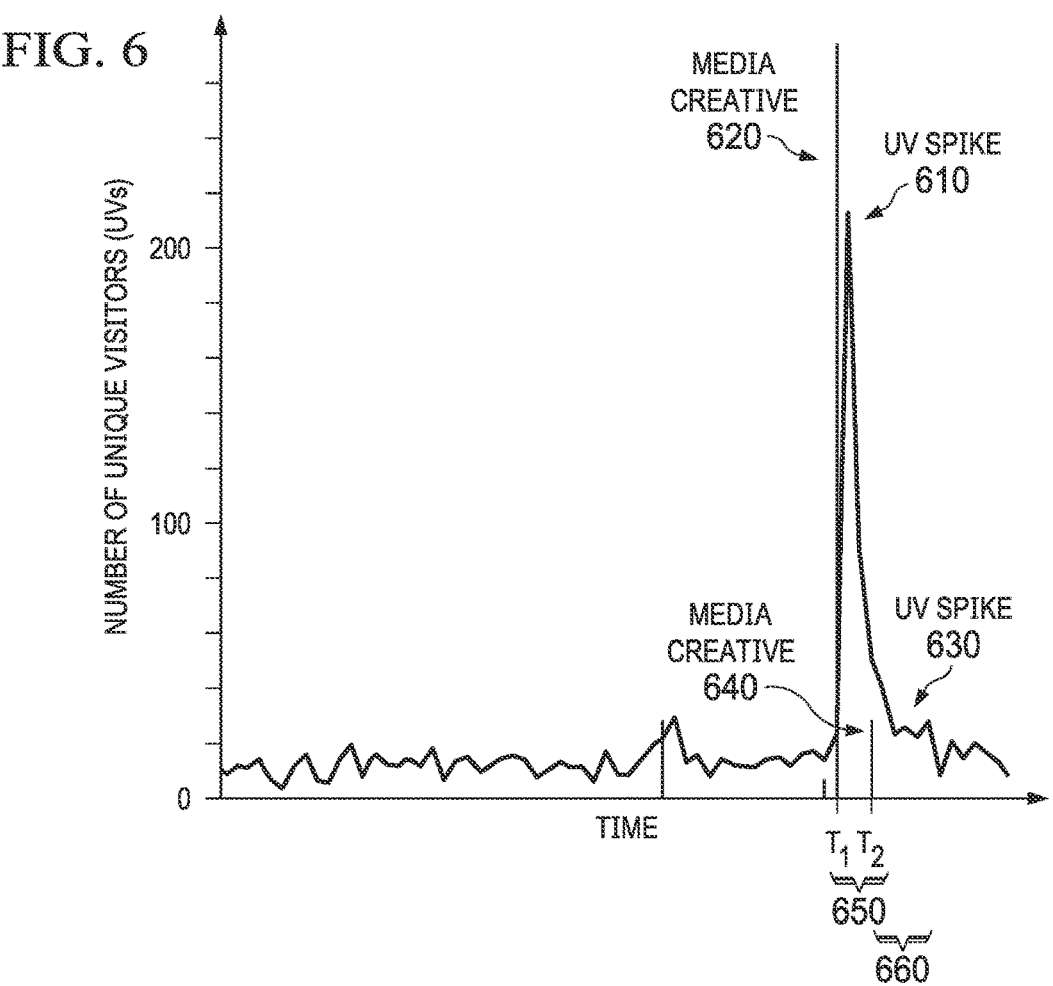
FIG. 6 depicts a plot diagram illustrating an example of a complex response profile.

In some cases, multiple media creatives may occur within the same time window. A response profile having multiple media creatives occurring within the same time window is considered a complex response profile. FIG. 6 illustrates an example of a complex response profile.

In the example shown in FIG. 6, media creatives 620 and 640 occurred within time window 650, during which UV spike 610 occurred. Media creative 620 was aired at a first time point ($T_1$) and media creative 640 was aired at a second time point ($T_2$), shortly after the first time point. In this case, the system is operable to determine that, of the 35 UVs associated with the lift, 23 are attributable to media creative 620 and 12 are attributable to media creative 640.

Another example of a complex response profile is shown in FIG. 7. In the example of FIG. 7, media creatives (Ad1 and Ad2) occurred within time window 750, during which UV spike 710 occurred. Referring to FIGS. 8A and 8B, media creative Ad1 (spot 1) was aired at a first time (13:47) and media creative Ad2 (spot 2) was aired at a second time (13:50) shortly after the first time. To compute the lift attributable per creative for a specific minute (e.g., at a third time, 13:51), the system is operable to determine that, of the 15 UVs associated with that time, 7.2 are counted as baseline, and the other 7.8 as the lift. Of that 7.8 lift, 2.3 are attributable to media creative Ad1 and 5.5 are attributable to media creative Ad2.

FIGS. 7, 8A, and 8B illustrate possible visualizations that show the allocation of lift due to multiple TV spots. Other types of visualizations are also possible.

In the above example, the dollars spent (referred to as "spend") are $400 for spot 1 and $200 for spot 2. In some embodiments, each spend associated with a TV spot is utilized as a proxy for a corresponding weight for the TV spot. The weight is utilized for attribution computation.

Accordingly, in some embodiments, method 300 may further include determining, using a weighting function, appropriate weights for media creatives that aired within the attribution time window (310). The weighting function is defined based on a plurality factors, including the audience size, temporal fingerprint, and historical network performance. In some embodiments, the plurality factors can be applied simultaneously or iteratively adjusted one factor at a time. Preferably, the system applies the plurality factors of the weighting function simultaneously.

In some embodiments, the weighting function determines what percentage of weight is assigned to each media creative in the attribution time window. For instance, the audience size can be determined using data provided by a third-party data provider that tracks, for instance, media viewers across 31 million households. As a non-limiting example, media creative spot 1 may be aired on a large TV network with a million viewers, while media creative spot 2 may be aired on a smaller TV network with 20,000 viewers. Based on these data points, the system can determine that the audience size for media creative spot 1 is 50 times that of media creative spot 2. That is, if the audience size for media creative spot 2 is X, the audience size for media creative spot 1 would be 50X. Put it another way, the weight for media creative spot 2 can be 20% or 0.2 of that for media creative spot 1.

As discussed above, in some cases, dollar spend per media creative can be used as a proxy for audience size. For example, it is possible that the audience size data is missing for a network (e.g., the network is not tracked by the third-party data provider). Since data on dollar spend can be readily obtained (e.g., from a media creative provider), the ratio of dollar spend can be used as a proxy for weighing the audience size. For instance, suppose $1000 is spent for one media creative, while $50 is spent for another media creative. In such a case, the audience size for the latter media creative can be assumed as $\frac{1}{20}^{th}$ that of the former media creative and 0.05 can be used as a weight for the audience size for the latter media creative.

As also discussed above, during the attribution time window, the total lift is calculated as: Lift(total)=sum(UV−baseline)

The total lift is allocated to individual media creatives based on a weighting function that incorporates various media creative attributes (factors) (315). Following the above example, weights determined for audience size can be utilized in determining appropriate attribution allocation of media creatives spot 1 and spot 2.

Alternatively or additionally, the historical network performance can be used to adjust the attribution allocation. For example, suppose a first media creative aired on a large network at 2:30 PM and a second media creative aired on a smaller network at 2:33 PM. At this time, two media creatives have aired within a five-minute attribution window. The system implementing method 300 may operate to first examine historical data and construct a response profile for each minute (or on a second-by-second basis in some embodiments) using data from a data provider. This time-based response profile provides a percentage of the incremental traffic to expect three seconds after a media creative airing.

Without historical network performance adjustments, an inherent assumption is that response rates, or % lift per viewed impression, will be uniform across networks. An adjustment can be incorporated into the computations by running through the attribution methodology as described, then taking the computed response rate per network and using those response rates to make adjustments to scale the attribution per network. This process can then be iterated until it quickly converges to finalized response rates per network. Note that the scaling factor can be applied in the same way (as a multiplicative factor), as the spend levels are leveraged in the computation.

In some cases, a response profile may only contains a single UV spike. However, the single UV spike may actually be a combined response from two spots aired within a minute or less of each other. This is illustrated in FIG. 7 which shows temporal fingerprinting of media creative Ad2 in attribution time window 760 being influenced by a tail end of media creative Ad1 that occurred outside of attribution time window 760.

Temporal fingerprinting is about figuring out how much of a UV spike is attributable to a media creative. If multiple media creatives aired on similar sized networks having similar audience sizes, it's a straightforward process to figure out. For example, two media creatives aired on similar sized networks having similar audience sizes, the appropriate weights for the two media creatives would be 50-50. However, as FIG. 7 illustrates, attribution allocation becomes a very complex problem when the latter one is smaller than the former one.

One reason is that audience size, which can differ from network to network, is not the only metric that can affect lift attribution allocation. There are additional factors involved in computing the intensity of lift. For instance, historical network performance can also affect lift attribution allocation. For example, there can be a 2-to-1 ratio of response rate between the two media creatives in general based on the networks (i.e., the larger network generally performs twice as high than the smaller network). As discussed above, the system can determine an expected response profile (e.g., an anticipated response rate) from historical data (e.g., provided by a data provider). The system can determine a weighting function utilizing the audience size times the anticipated response rate adjusted by temporal fingerprint. The system can then apply the weighting function to the number of UVs on a minute-by-minute basis (or on any suitable time unit).

This approach can be particularly useful when one media creative is smaller than the other one aired earlier. For instance, as illustrated in FIG. 7, by the time that media creative Ad2 was aired, the residual impact of UV spike 710 from media creative Ad1 is still large enough to overshadow the impact of the smaller media creative Ad2, even though media creative Ad1 occurred outside of window 760. That is, in the example of FIG. 7, media creative Ad2 actually benefited from a response profile of media creative Ad1, which is significantly larger than media creative Ad2. As illustrated in FIG. 7, the response profile of media creative Ad2 is influenced by the shadow of the residual lift caused by the larger, earlier media creative Ad1. Although some small UV spikes seem to have also occurred in attribution time window 760, it is unclear how much of the total lift in attribution time window 760 is attributable to media creative Ad2 and how much is attributable to the shadow of media creative Ad1 (as exemplified by shadow lift 730 shown in FIG. 7). This is referred to as a shadow lift problem.

As discussed above, a response profile is determined on a time unit basis (e.g., a minute) within a tight attribution time window (e.g., five minutes). As such, the response profile may not accurately reflect a shadow lift from rather large media creatives. To account for the influence of such a shadow lift (which is caused by a media creative that occurred relatively close in time, but outside of the current attribution time window), the system may determine a shadow baseline for an extended time window that extends beyond the tight attribution window. The system may then use the shadow baseline to adjust the baseline for future lift. The shadow baseline is not used in determining attribution allocation. Rather, it is used to adjust the baseline, based on which the total lift is determined. For example, the overall lift from a very large media creative can be distributed as follows:

min 1—50%
min 2—25%
min 3—17%
. . .
min 7—2.5%
min 8—1.5%
min 9—negligible The lift associated with a media creative beyond the tight attribution time window is already incorporated in the drag factor; however, the system will reduce future lift of media creatives occurring just outside of the window of lift for the prior media creatives. There are various reasons why the system only leverages the extended time window (e.g., 15-20 minutes) as a shadow for adjusted future lift instead of just extending the attribution window in general. One example is the unfavorable signal to noise ratio in these shadow regions, which would unnecessarily create more volatility in the results.

As discussed above, FIGS. 8A and 8B together show how lift is attributable to two spots that aired in close proximity temporally. In the non-limiting example of FIGS. 8A and 8B, the lift columns show the final computed lift values that will be allocated to each of the spots based on the overall lift for each minute (minutely lift).

Figure 9:
FIG. 9 is a diagrammatical representation of a user interface showing an example of a report with relative performance measures attributed to TV spots aired on different networks.

Essentially, the system determines the response profile (within an attribution time window) and runs the shadow baseline analysis (within the extended window) on every media creative to determine whether the response profile should be adjusted to obtain the correct total lift. The system can then determine the appropriate weights and attribution allocation of each media creative within the attribution window. In some embodiments, the attribution allocation of each media creative within the attribution window can be utilized in determining the relative performance levels/metrics of media creatives. The system can generate a report and/or send a notification to a user of the results (e.g., attribution allocation, performance metrics, etc.) determined by the system. FIG. 9 shows an example of how such a report can be visualized through user interface or dashboard 900.

Figure 10:
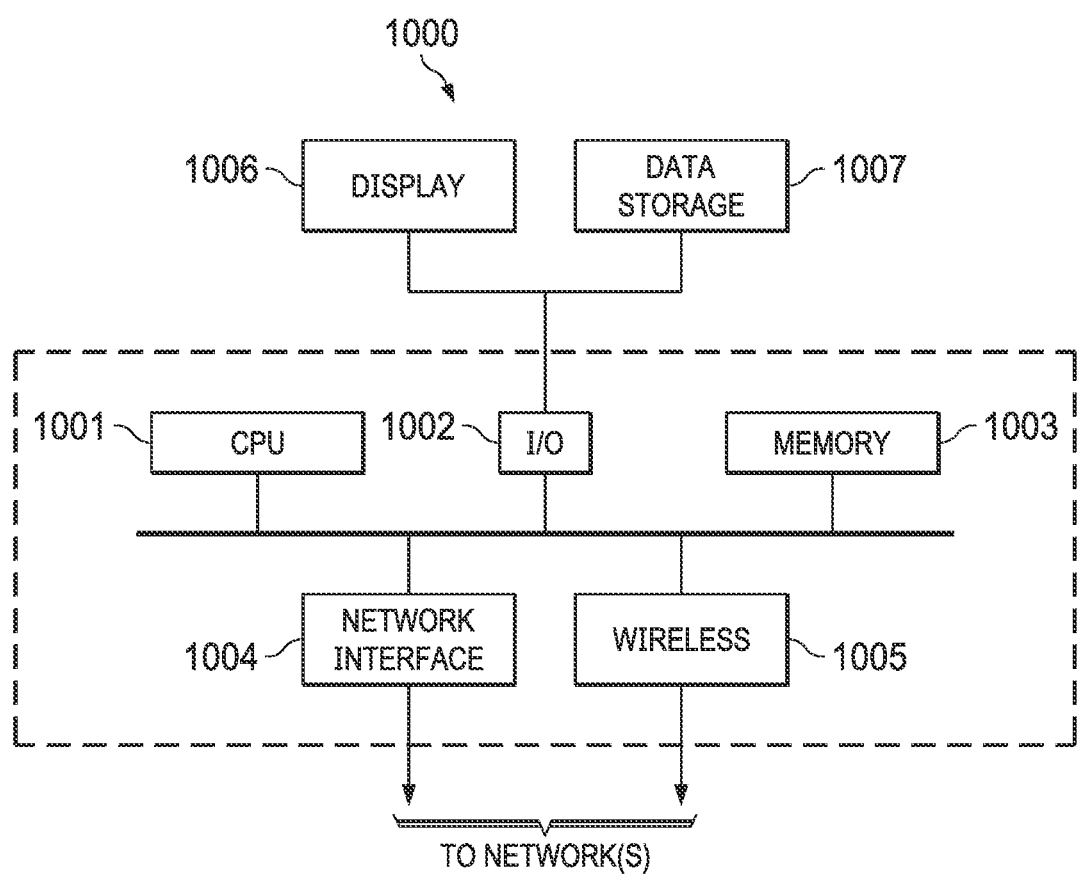
FIG. 10 depicts a diagrammatic representation of a data processing system for implementing a system according to some embodiments disclosed herein.

FIG. 10 depicts a diagrammatic representation of a data processing system for implementing a system for processing messages. As shown in FIG. 10, data processing system 1000 may include one or more central processing units (CPU) or processors 1001 coupled to one or more user input/output (I/O) devices 1002 and memory devices 1003. Examples of I/O devices 1002 may include, but are not limited to, keyboards, displays, monitors, touch screens, printers, electronic pointing devices such as mice, trackballs, styluses, touch pads, or the like. Examples of memory devices 1003 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1000 can be coupled to display 1006, information device 1007 and various peripheral devices (not shown), such as printers, plotters, speakers, etc. through I/O devices 1002. Data processing system 1000 may also be coupled to external computers or other devices through network interface 1004, wireless transceiver 1005, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

The invention claimed is:

1. A media creative attribution method, comprising:
    determining, by a computer, a response profile over successive time periods within an attribution time window, the response profile being a portion of a unique visitor (UV) curve associated with a website, wherein the portion corresponds to a time period that one or more media creatives aired on an offline medium;
    obtaining, by the computer, a baseline of the UV curve associated with the website, wherein the baseline is the UV curve for the website without any media creative airing and is associated with the attribution time window;
    determining, by the computer utilizing the baseline, a total lift within the attribution time window;
    determining, by the computer utilizing a weighting function, a weight for each of the one or more media creatives that aired within the attribution time window, the weighting function relating at least to an audience size for each respective media creative that aired within the attribution time window;
    allocating, by the computer, the total lift to individual media creatives that aired within the attribution time window, the allocating including applying the determined weight for each respective media creative that aired within the attribution time window corresponding to the response profile to thereby determine a lift associated with each respective media creative during time periods of the attribution time window, each determined lift representing an incremental attribution associated with the respective media creative during a respective time period;
    determining, by the computer utilizing the determined lifts allocated to individual media creatives that aired within the attribution time window corresponding to the response profile, performance metrics relating to the individual media creatives that aired within the attribution time window corresponding to the response profile; and
    presenting, through a user interface, the performance metrics on a display.

2. The media creative attribution method of claim 1, wherein the total lift is determined by:
    subtracting the baseline from the UV spike to obtain a lift per time period; and
    aggregating the lift per time period within the attribution time window.

3. The media creative attribution method of claim 1, wherein the attribution time window has a size of five minutes.

4. The media creative attribution method of claim 1, further comprising:
    utilizing dollar spend per media creative as a proxy for the audience size.

5. The media creative attribution method of claim 1, wherein the response profile includes a shadow lift from a media creative that aired outside the attribution time window, the method further comprising:
    determining a shadow baseline for an extended time window that extends beyond the attribution time window; and
    prior to determining the total lift within the attribution time window, adjusting the baseline utilizing the shadow baseline for the extended time window.

6. The media creative attribution method of claim 5, further comprising:
    running a shadow baseline analysis within the extended time window on every media creative that aired within the extended time window; and
    based on the shadow baseline analysis, determining whether to adjust the response profile prior to determining the total lift within the attribution time window.

7. The media creative attribution method of claim 5, wherein the extended time window has a size of about 15 to 20 minutes.

8. A system, comprising:
    a processor;
    a non-transitory computer-readable medium; and
    stored instructions translatable by the processor for:
        determining a response profile over successive time periods within an attribution time window, the response profile being a portion of a unique visitor (UV) curve associated with a website, wherein the portion corresponds to a time period that one or more media creatives aired on an offline medium;
        obtaining a baseline of the UV curve associated with the website, wherein the baseline is the UV curve for the website without any media creative airing and is associated with the attribution time window;
        determining, utilizing the baseline, a total lift within the attribution time window;
        determining, utilizing a weighting function, a weight for each of the one or more media creatives that aired within the attribution time window, the weighting function relating at least to an audience size for each respective media creative that aired within the attribution time window;
        allocating the total lift to individual media creatives that aired within the attribution time window, the allocating including applying the determined weight for each respective media creative that aired within the attribution time window corresponding to the response profile to thereby determine a lift associated with each respective media creative during time periods of the attribution time window, each determined lift representing an incremental attribution associated with the respective media creative during a respective time period;
        determining, utilizing the determined lifts allocated to individual media creatives that aired within the attribution time window corresponding to the response profile, performance metrics relating to the individual media creatives that aired within the attribution time window corresponding to the response profile; and presenting, through a user interface, the performance metrics on a display.

9. The system of claim 8, wherein the total lift is determined by:

subtracting the baseline from the UV spike to obtain a lift per time period; and aggregating the lift per time period within the attribution time window.

10. The system of claim 8, wherein the attribution time window has a size of five minutes.

11. The system of claim 8, wherein the stored instructions are further translatable by the processor for:

utilizing dollar spend per media creative as a proxy for the audience size.

12. The system of claim 8, wherein the response profile includes a shadow lift from a media creative that aired outside the attribution time window, the method further comprising:

determining a shadow baseline for an extended time window that extends beyond the attribution time window; and prior to determining the total lift within the attribution time window, adjusting the baseline utilizing the shadow baseline for the extended time window.

13. The system of claim 12, wherein the stored instructions are further translatable by the processor for:

running a shadow baseline analysis within the extended time window on every media creative that aired within the extended time window; and based on the shadow baseline analysis, determining whether to adjust the response profile prior to determining the total lift within the attribution time window.

14. The system of claim 12, wherein the extended time window has a size of about 15 to 20 minutes.

15. A non-transitory computer-readable medium storing instructions translatable by a processor for:

determining a response profile over successive time periods within an attribution time window, the response profile being a portion of a unique visitor (UV) curve associated with a website, wherein the portion corresponds to a time period that one or more media creatives aired on an offline medium;

obtaining a baseline of the UV curve associated with the website, wherein the baseline is the UV curve for the website without any media creative airing and is associated with the attribution time window;

determining, utilizing the baseline, a total lift within the attribution time window;

determining, utilizing a weighting function, a weight for each of the one or more media creatives that aired within the attribution time window, the weighting function relating at least to an audience size for each respective media creative that aired within the attribution time window;

allocating the total lift to individual media creatives that aired within the attribution time window, the allocating including applying the determined weight for each respective media creative that aired within the attribution time window corresponding to the response profile to thereby determine a lift associated with each respective media creative during time periods of the attribution time window, each determined lift representing an incremental attribution associated with the respective media creative during a respective time period;

determining, utilizing the determined lifts allocated to individual media creatives that aired within the attribution time window corresponding to the response profile, performance metrics relating to the individual media creatives that aired within the attribution time window corresponding to the response profile; and presenting, through a user interface, the performance metrics on a display.

16. The non-transitory computer readable medium of claim 15, wherein the total lift is determined by:

subtracting the baseline from the UV spike to obtain a lift per time period; and aggregating the lift per time period within the attribution time window.

17. The non-transitory computer readable medium of claim 15, wherein the attribution time window has a size of five minutes.

18. The non-transitory computer readable medium of claim 15, wherein the instructions are further translatable by the processor for:

utilizing dollar spend per media creative as a proxy for the audience size.

19. The non-transitory computer readable medium of claim 15, wherein the response profile includes a shadow lift from a media creative that aired outside the attribution time window, the method further comprising:

determining a shadow baseline for an extended time window that extends beyond the attribution time window; and prior to determining the total lift within the attribution time window, adjusting the baseline utilizing the shadow baseline for the extended time window.

20. The non-transitory computer readable medium of claim 19, wherein the instructions are further translatable by the processor for:

running a shadow baseline analysis within the extended time window on every media creative that aired within the extended time window; and based on the shadow baseline analysis, determining whether to adjust the response profile prior to determining the total lift within the attribution time window.

* * * * *